Nov. 25, 1930.  F. OUDIN ET AL  1,782,438

CLAMPING DEVICE

Filed April 30, 1929  2 Sheets-Sheet 1

Inventors
Ferdinand Oudin &
Benjamin H. Skinner
By  Attr.

Nov. 25, 1930. F. OUDIN ET AL 1,782,438
CLAMPING DEVICE
Filed April 30, 1929   2 Sheets-Sheet 2
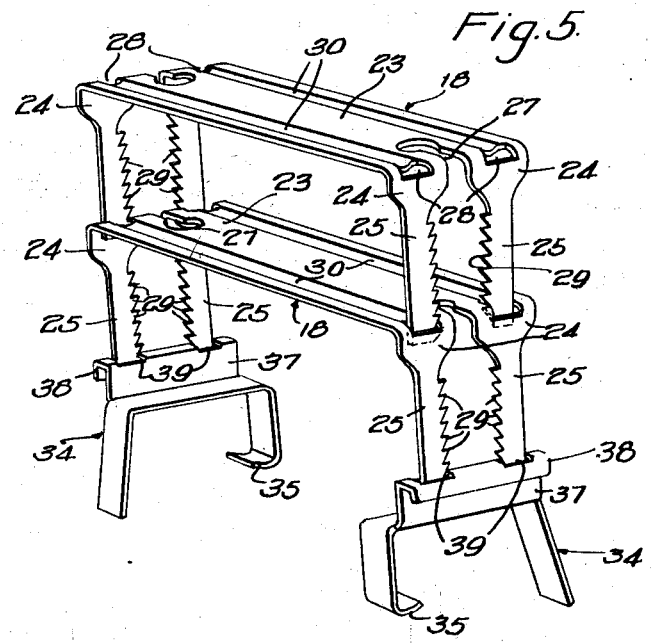
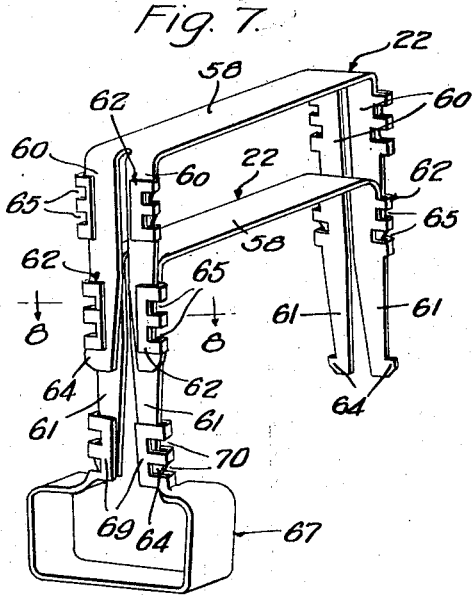
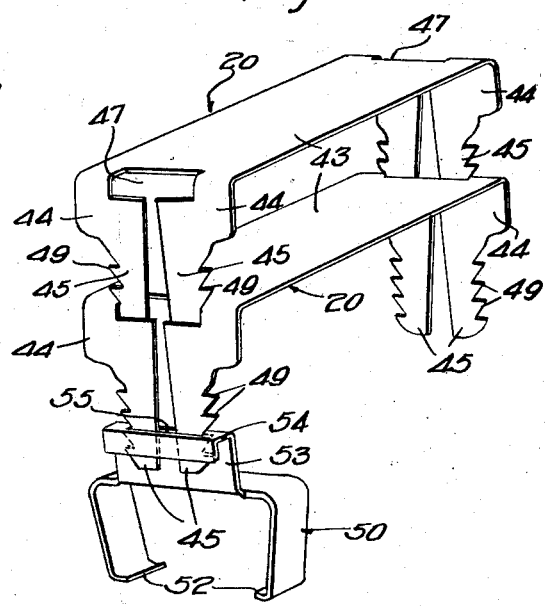
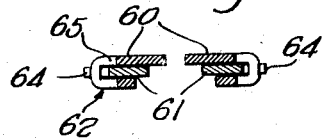
Inventors
Ferdinand Oudin &
Benjamin H. Skinner
By  H. A. Tatton  Att'y.

Patented Nov. 25, 1930

1,782,438

UNITED STATES PATENT OFFICE

FERDINAND OUDIN, OF RIVERSIDE, AND BENJAMIN HARVEY SKINNER, OF BERWYN, ILLINOIS, ASSIGNORS TO WESTERN ELECTRIC COMPANY, INCORPORATED, OF NEW YORK, N. Y., A CORPORATION OF NEW YORK

CLAMPING DEVICE

Application filed April 30, 1929. Serial No. 359,341.

This invention relates to clamping devices, and more particularly to devices for fastening strands or cables to supports and to each other.

The invention has for its principal object the provision of improved and readily adjustable clamping devices of simple and economical construction for attaching strands or cables to a supporting framework and to each other.

In accordance with the above object, the invention contemplates the provision of improved cable clamping devices consisting of flat metal strip material formed into three sided loop members for surrounding groups of cables and having bifurcated ends for engaging a base member or a previously installed clamping device to attach the enclosed group of cables to a support or to a previously installed group of cables. In one form of the invention, the bifurcated ends are provided with internal or external edge teeth for selective engagement by the edges of slots formed in a base member or a previously installed clamping device to provide vertical adjustment for accommodating various numbers and sizes of cables, while in another form, the bifurcated ends are provided with single outwardly extending projections for selectively engaging a plurality of transverse slots formed in a turned-over pocket portion of a base member or previously installed clamping device.

Figure 1:
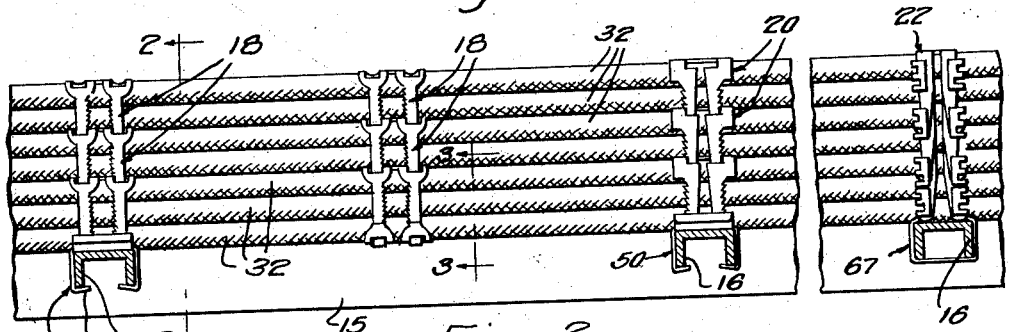
Figure 2:
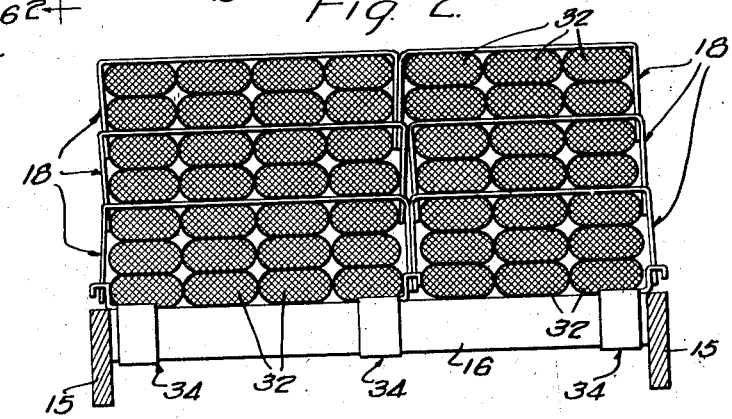
Figure 3:
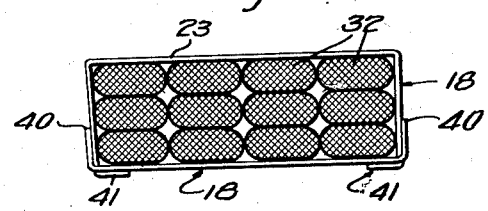
Figure 4:
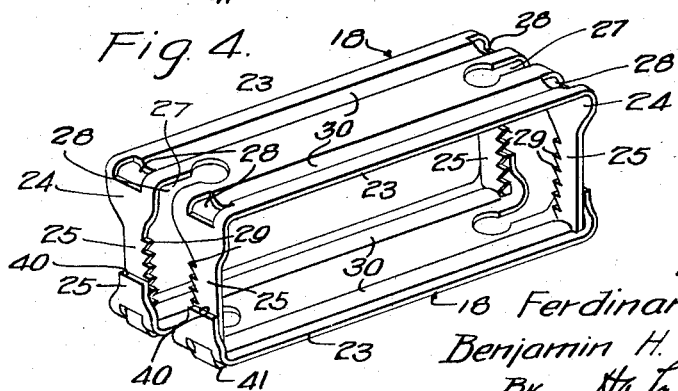

A more complete understanding of the invention will be had from the following detailed description, reference being had to the accompanying drawings, wherein Fig. 1 is a fragmentary side elevational view, partly in section, of a group of cables shown attached to a supporting framework and to each other by means of several different forms of clamping devices embodying the features of the invention, Fig. 2 is an enlarged transverse section taken on line 2—2 of Fig. 1, Fig. 3 is an enlarged fragmentary section taken on line 3—3 of Fig. 1 showing a group of cables clamped together by means of a pair of clamping devices embodying the invention, Fig. 4 is an enlarged perspective view of the clamping devices shown in Fig. 3, Figs. 5, 6 and 7 are enlarged perspective views of the several forms of the improved clamping devices, and Fig. 8 is an enlarged section taken on line 8—8 of Fig. 7.

Clamping devices embodying the features of the invention may be employed to advantage in telephone exchanges for attaching the cables of electrical conductors interconnecting the electrical apparatus, to a supporting framework. As shown in Figs. 1 and 2, the cable supporting framework may consist of a pair of spaced parallel bars or stringers 15 interconnected by a plurality of spaced cross-straps 16, preferably formed of channel iron. The cables are usually attached to the framework with their longitudinal axes parallel to the stringers 15 and at right angles to the cross channels 16. It will be observed that the clamping devices supporting the first few layers of cables are attached to suitable base members or clamps secured at predetermined positions along the channels 16. Additional layers of cables are fastened to the preceding layers by means of clamping devices which are attached to the devices supporting the preceding layers.

In the drawings, several alternative forms of the improved clamping device are shown and are designated, generally, by the reference numerals 18, 20 and 22. Although the several forms differ somewhat in construction and design, it will be understood that the general features and characteristics thereof are substantially the same. Each of the several forms consists, essentially, of flat strip material, preferably resilient sheet metal, formed into a three sided or substantially U-shaped member, the bent over ends or legs of which are bifurcated and formed with means for adjustably engaging a similar member or base clamp to attach a plurality of individual cables or groups of cables to each other or to a supporting framework.

The clamping device 18, as best shown in Fig. 5, comprises a horizontal portion 23 interconnecting a pair of vertical bent over end portions, each of which is bifurcated to provide a pair of spaced legs 24, 24 having reduced extremities 25, 25. The horizontal portion 23 is slotted at each end as indicated at 27 for the purpose of lending flexibility to the vertical legs 24. Spaced transverse slots 28, 28 are provided at the ends of the horizontal portion 23 of the clamping device 18 for accommodating the reduced vertical extremities 25 of a cooperating similar device. The reduced extremities 25 of each clamping device are provided on their inside edges with a series of spaced projections or teeth 29 for selective engagement by the edges of the transverse slots 28 in the horizontal portion 23 of a cooperating similar device to provide vertical adjustment for accommodating various numbers and sizes of cables. The horizontal portion 23 is provided with longitudinally extending depressed beads or ribs 30, 30 which become embedded in the cables when the device is clamped in position, thereby preventing longitudinal displacement of the cables. The ribs 30 also serve to stiffen the horizontal portion 23 of the clamping device.

When employing the clamping devices 18 for attaching a run or group of cables 32 (Fig. 1) to a supporting framework, the clamping devices enclosing the first layers of cables are attached to suitable base clamps adapted to be secured to the framework, as hereinbefore described. As shown in Figs. 1 and 2, the clamping devices 18 enclosing the first three layers of cables 32 are attached to base clamps 34, 34 secured to the cross channels 16. The base clamp 34 may consist of flat strip material, preferably sheet metal, formed into a three sided loop for engaging the web and sides of the channel, and having one end thereof bent inwardly as indicated at 35 (Fig. 5) for engaging the lower edge of a flange or side of the channel. The other side of the loop normally extends straight outwardly and is adapted to be bent inwardly and around the lower edge of the opposite side or flange of the channel, as shown in Fig. 1. The top or horizontal portion of the base clamp is formed with an upwardly extending portion 37 terminating in an inverted U-shaped channel portion 38 having spaced slots 39, 39 for accommodating the vertical extremities 25 of a clamping device 18. The inner edges of the slots 39 are adapted to selectively engage the edge teeth 29 of the vertical extremities 25 to provide vertical adjustment for accommodating various numbers and sizes of cables. This vertical adjustability also provides a simple and efficient means for accommodating slight variations in the dimensions of similar types or sizes of cables, such as may be caused by slight variations in the sizes of the composite conductors or by other variations encountered in commercial manufacturing conditions. Furthermore, the clamping devices automatically adjust themselves to dimensional variations of the cables resulting from the compressing force of superimposed layers of cables.

In attaching a run or group of cables to a supporting framework, a pair of base clamps 34 are first clamped at predetermined positions along each or certain of the cross channels 16 and the cables are then arranged in horizontal layers along the cross channels in the spaces defined by the base clamps. Clamping devices 18 are then placed around the cables and are pressed downwardly to firmly clamp the cables to the channels 16, the toothed extremities 25 of the clamping devices extending into the slots 39 of the base clamps and automatically becoming interlocked therewith by the engagement of the inner edges of the slots with the teeth 29, as hereinbefore described. In a similar manner, additional cables or groups of cables may be attached to the supporting framework by means of additional base clamps 34 secured to the channels 16 at predetermined positions spaced from the preceding base clamps. Also, when desired, additional layers or groups of cables may be superimposed upon previously installed groups thereof and may be readily and securely attached thereto by means of clamping devices 18 adapted to interlock with previously installed clamping devices.

It will be noted that the slots 28 of the clamping devices 18 and the slots 39 of the base clamps 34 are of sufficient width to accommodate the reduced extremities 25 of two clamping devices positioned side by side whereby the clamping devices enclosing adjacent groups of cables may be readily and conveniently interlocked. This construction permits the interlocking, when desired, of adjacent groups of cables, as shown in Fig. 2. It is to be understood, of course, that the improved clamping devices may be made in various lengths and that the vertical end portions 25 thereof may be cut to any convenient lengths to accommodate various numbers and sizes of cables.

When attaching a plurality of cables to a supporting framework it is sometimes desirable to interlock the cables at positions where it is inconvenient to attach them to the framework. Thus, for example, in the embodiment of the invention illustrated in Fig. 1, it may be desirable to interlock the individual cables or groups of cables at a point intermediate the cross channels 16. This may be readily and conveniently accomplished by means of clamping devices embodying the present invention. As shown in Fig. 3, a plurality of cables 32 are enclosed within a pair of cooperating oppositely disposed clamping devices 18, one of which is disposed in an inverted position with its reduced extremities 25 severed therefrom, as indicated at 40. The clamping devices are then pressed toward each other to securely clamp the enclosed cables to each other, the toothed extremities 25 of the upper clamping device extending into the slots 28 of the inverted or lower clamping device and automatically becoming interlocked therewith in the manner hereinbefore described. The projecting ends of the reduced extremities 25 of the upper clamping device are bent over the horizontal portion of the lower clamping device, as indicated at 41 (Figs. 3 and 4). If desired, clamping devices enclosing additional cables or groups of cables may be attached to the clamping devices enclosing previously supported groups of cables. In this manner the individual cables or groups of cables may be securely interlocked at positions where it is inconvenient to attach them to the supporting framework.

The clamping device 20, shown in perspective in Fig. 6, is similar to the clamping device 18 in that it also comprises a flat horizontal portion 43 interconnecting a pair of vertical bent over end portions, each of which is bifurcated to provide a pair of spaced legs 44, 44 having reduced extremities 45, 45. A transverse slot 47 is provided at each end of the horizontal portion 43 for accommodating the reduced vertical extremities 45 of a cooperating clamping device. The reduced extremities 45 are provided on their outside edges with a series of projections or teeth 49 for selective engagement by the edges of the slots 47 of a cooperating clamping device to provide vertical adjustment for accommodating various numbers and sizes of cables.

A base clamp 50 (Fig. 6) similar to the base clamp 34, may be employed with the clamping device 20 for attaching the first layers of cables to a supporting framework. The base clamp 50 may consist of flat resilient sheet metal formed into a three sided loop for enclosing a cross channel 16 of the framework and having the ends thereof bent inwardly as indicated at 52 for engaging the edges of the flanges of the channel. The top or horizontal portion of the base clamp 50 is provided with an upwardly extending portion 53 terminating in an inverted U-shaped channel portion 54 having a slot 55 for accommodating the vertical extremities 45 of a clamping device 20. The edges of the slot 55 are adapted to selectively engage the edge teeth 49 of the vertical extremities 45 to provide vertical adjustment for accommodating various numbers and sizes of cables.

An alternative form of clamping device embodying the features of the invention is illustrated in perspective in Fig. 7 and is designated, generally, by the reference numeral 22. This form of clamping device comprises a flat horizontal portion 58 interconnecting a pair of vertical bent over end portions, each of which is bifurcated to provide a pair of spaced legs 60, 60 having tapered end portions 61, 61. Transverse portions extending from opposite sides of the legs 60 are bent over to form a pocket 62 for accommodating the extremities 61 of a cooperating clamping device. The extremities 61 are each provided with an outwardly extending projection or tooth 64 for selectively engaging a series of spaced transverse slots 65, 65 formed in opposite sides of the pocket 62 of a cooperating clamping device to provide vertical adjustment for accommodating various numbers and sizes of cables.

A base clamp 67 may be employed with the clamping device 22 for attaching the first layers of cables to a supporting framework. The base clamp 67 may consist of flat resilient sheet metal formed into a loop for surrounding a portion of the framework and having upwardly extending portions formed into open pockets 69, 69 for accommodating the end portions 61 of a clamping device 22. The pockets 69 are provided with a series of spaced transverse slots 70, 70 for selective engagement by the toothed extremities 64 to provide vertical adjustment.

It is obvious that each of the several alternative forms of clamping devices herein disclosed may be employed as described above in connection with the clamping device 18 for readily and securely attaching various numbers and sizes of cables to a supporting framework and to each other. It is to be understood, also, that the embodiments of the invention herein illustrated and described merely represent several useful forms of the invention which is capable of numerous other applications within the scope of the appended claims.

What is claimed is:

1. A clamping device comprising a substantially flat portion terminating in a bifurcated portion formed with a tooth means on a longitudinal edge thereof for adjustably engaging the edges of a support.

2. A clamping device comprising a horizontal portion having a transverse slot, and a vertical portion having a tooth on an edge thereof and lying within the plane of said portion for adjustable interlocking engagement with an edge of a slot in a cooperating member to provide an adjustable enclosure.

3. A cable clamping device consisting of flat strip material formed into a three sided loop member having toothed means projecting from a longitudinal edge of a side portion thereof and lying within the plane of said portion for adjustable interlocking engagement with an edge portion of a second member and cooperating with the second member to enclose a cable.

4. A cable clamping device consisting of flat resilient material formed into a three sided loop for enclosing a plurality of cables, and terminating in a bifurcated portion formed with toothed means for adjustably engaging the edge of a slot in a cooperating similar member terminating in a bifurcated portion to accommodate various numbers and sizes of cables.

5. A cable clamping device comprising a substantially U-shaped member for enclosing a cable, and having bifurcated ends for adjustable interlocking engagement with a base member carried by a support to attach the enclosed cable to the support.

6. A cable clamping device comprising a substantially U-shaped member having a toothed bifurcated end portion for engagement with a support, and provided with transverse slots for engaging a tooth of the bifurcated end portion of a similar U-shaped member.

7. In a device for attaching a strand to a supporting channel, a base clamp attachable to the channel, and a member having a flat strand engaging portion terminating in a right angle portion for adjustably engaging the base clamp to accommodate various sizes of strands.

8. A clamping device consisting of resilient sheet material formed into a three sided loop member comprising a horizontal portion interconnecting a pair of bifurcated vertical portions, the horizontal portion having spaced transverse slots and the vertical portions terminating in reduced extremities formed with means for interlocking engagement with the transverse slots of another member.

9. A cable clamping device comprising a three sided loop member consisting of a horizontal portion interconnecting a pair of bifurcated vertical portions terminating in reduced extremities provided with a plurality of spaced projections, the horizontal portion having slots for accommodating the reduced extremities of a second similar cooperating member in such manner that the edges of the slots of the first member selectively engage the spaced projections on the reduced extremities of the second member to provide vertical adjustment for accommodating various numbers and sizes of cable.

10. A cable clamping device comprising a three sided loop member consisting of a horizontal portion interconnecting a pair of bifurcated vertical portions terminating in reduced extremities provided with a plurality of spaced internally projecting edge teeth, the horizontal portion having spaced transverse slots for accommodating the reduced extremities of a second member in such manner that the edges of the slot of the first member selectively engage the internally projecting teeth on the reduced extremities of the second member to provide vertical adjustment.

In witness whereof, we hereunto subscribe our names this 19th day of April A. D., 1929.

FERDINAND OUDIN.
BENJAMIN HARVEY SKINNER.